C. J. STROMBERG.
Portfolios.
No. 212,762. Patented Feb. 25, 1879.
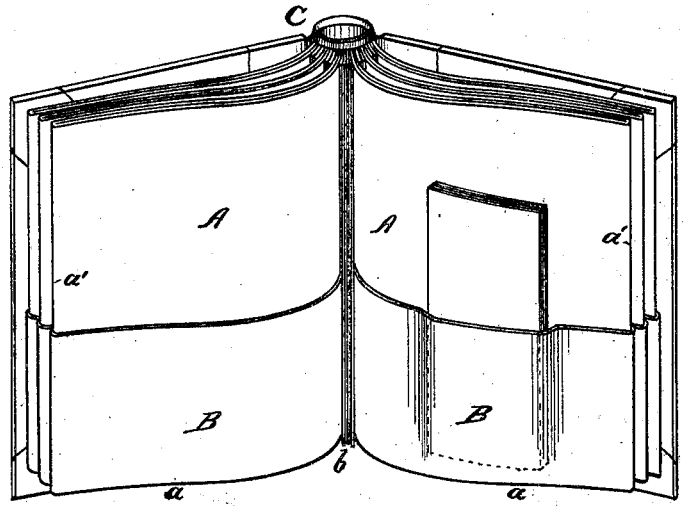
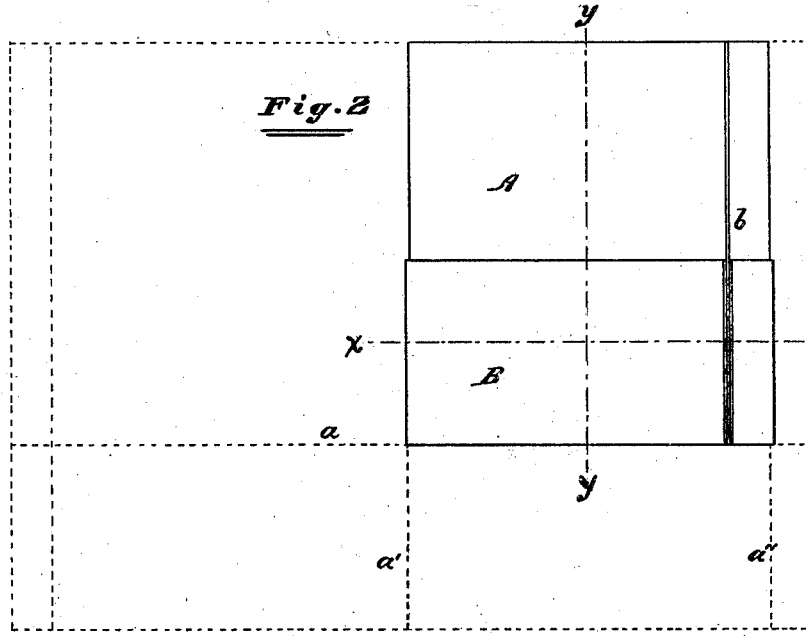
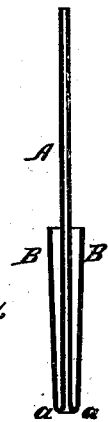
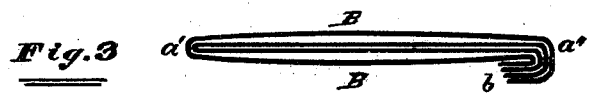
Attest:
S. S. Schoff
C. H. Schoff
INVENTOR:
Charles J. Stromberg
By F. F. Warner, his
Attorney.

UNITED STATES PATENT OFFICE.

CHARLES J. STROMBERG, OF CHICAGO, ILLINOIS.

IMPROVEMENT IN PORTFOLIOS.

Specification forming part of Letters Patent No. 212,762, dated February 25, 1879; application filed December 26, 1878.

*To all whom it may concern:*

Be it known that I, CHARLES J. STROMBERG, of Chicago, in the county of Cook and State of Illinois, have invented certain new and useful Improvements in Portfolios, of which the following, in connection with the accompanying drawings, is a specification:

Figure 1 is a perspective view of a portfolio embodying my invention; Fig. 2, a plan view of one of the sheets or blanks detached; Fig. 3, a section in the plane of the line $x\ x$ of Fig. 2; and Fig. 4, a section in the plane of the line $y\ y$ of Fig. 2.

Like letters of reference indicate like parts.

A represents a sheet of stout paper folded in the manner hereinafter described, and which, before being folded, covers a space included by the outer broken lines shown in Fig. 2. To make a leaf for my portfolio, I fold the sheet A along the line $a$, making the fold of a width equal to the depth of the pocket to be thereby formed. I then fold the sheet along the line $a'$ to make a double sheet with a pocket on each exterior side.

B B represent the pockets. The free vertical edges of the sheet, including the corresponding edges of the pockets, are thus all arranged in position for being bound, and when bound, as will be perceived, the leaves will each consist of a continuous sheet folded to render it double and to form a pocket on each exterior side thereof. In other words, the sheet of which the leaf is made is folded upon itself to form these pockets, and centrally in a line coinciding with the forward or free end or edge of the leaf to render the leaf double and to make a pocket on each exterior side thereof, substantially as shown. C is a cover into which a number of these leaves may be bound. An index may be used in connection with the portfolio, but is not absolutely necessary.

It will be perceived that a portfolio having a large number of capacious pockets arranged so as to be conveniently accessible, and so as to retain their contents with certainty, is thus easily made, no paste, glue, or mucilage being necessary in constructing the pockets.

Stubs may be bound in between the rear edges of the leaves in order to render the portfolio uniformly thick when the pockets are filled. These stubs may be made and applied in the usual manner. They may also be made by folding the rear edges of the leaves forward—for example, along the line $a''$, thus forming the stubs $b$, which will be continuous with the leaves; but I do not here intend to restrict myself to this mode of forming the stubs, as they may be made in any well-known or suitable way.

Having thus described my invention, what I claim as new, and desire to secure by Letters Patent, is—

1. In a portfolio wherein the leaves are bound together along their rear edges, two consecutive leaves having uncut or continuous front edges and a deep open fold extending continuously along the entire lower edges of both, substantially as and for the purposes specified.

2. In a portfolio wherein the leaves are bound together along their rear edges, two consecutive leaves having folds laid forward along the said edges, having uncut or continuous front edges and a deep open fold extending continuously along the entire lower edges of both, substantially as and for the purposes specified.

CHARLES J. STROMBERG.

Witnesses:
F. F. WARNER,
J. B. PHILLIPS.